March 3, 1931. H. CONZELMANN ET AL 1,795,010
ELECTRIC SWITCH BOX
Filed Jan. 12, 1925  2 Sheets-Sheet 1

Inventors.
Heinrich Conzelmann
Robert Main
by Steward Mackay
their attorneys.

March 3, 1931. H. CONZELMANN ET AL 1,795,010
ELECTRIC SWITCH BOX
Filed Jan. 12, 1925    2 Sheets-Sheet 2

Inventors.
Heinrich Conzelmann
and Robert Maier
by Steward & McKay
their attorneys.

Patented Mar. 3, 1931

1,795,010

UNITED STATES PATENT OFFICE

HEINRICH CONZELMANN, OF STUTTGART-GABLENBERG, AND ROBERT MAIER, OF STUTTGART, GERMANY, ASSIGNORS TO ROBERT BOSCH AKTIENGESELLSCHAFT, OF STUTTGART, GERMANY

ELECTRIC-SWITCH BOX

Application filed January 12, 1925, Serial No. 1,938, and in Germany January 24, 1924.

Our invention relates to a switch box intended for use in connection with the electric installation of power-vehicles and the like, and being distinguished by the particular arrangement and combination of the parts forming and composing it. It consists essentially of three superposed main parts, of which one carries the electrically active members, the second carries the locking means provided for them, and also carries the manipulation grips necessary to actuate the active members of the box and to combine them into one set. The third carries the push-button used to close the starter circuit and is apertured to permit passage of the rotatable member for actuating the electrically active members and to permit access to the locking means. The members of any of said three parts can be examined and tested independently of the members of the other parts, as will appear from the detailed description in the subsequent paragraphs of this specification.

Figure 1:
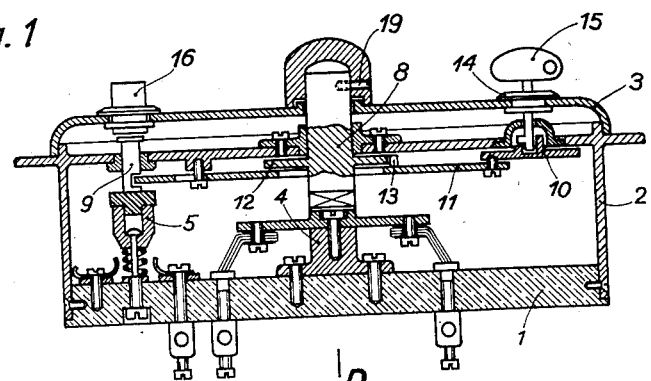
Figure 2:
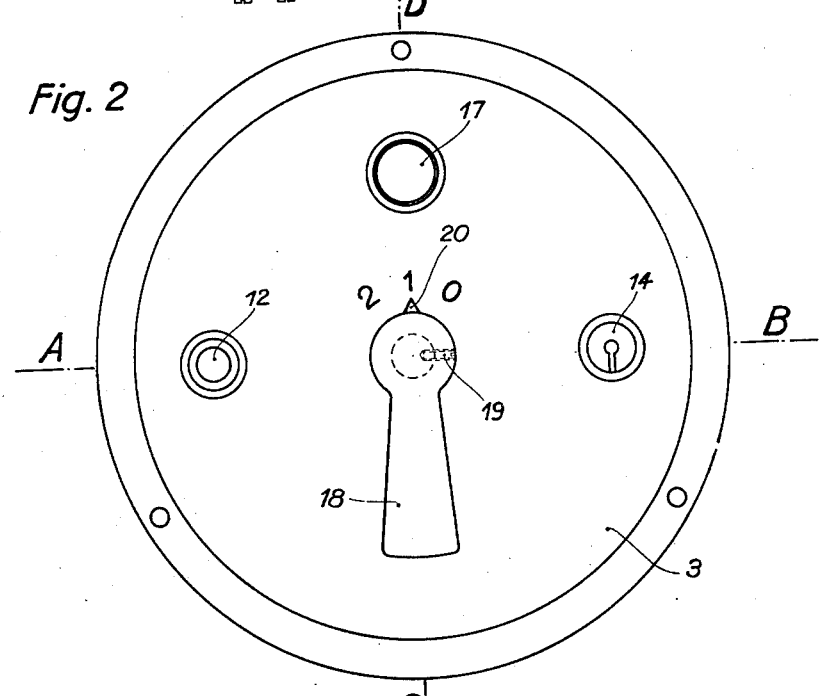
Figure 3:
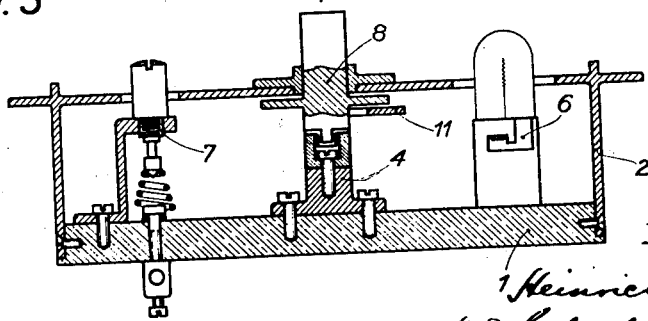
Figure 4:
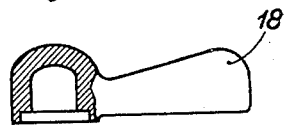
Figure 5:
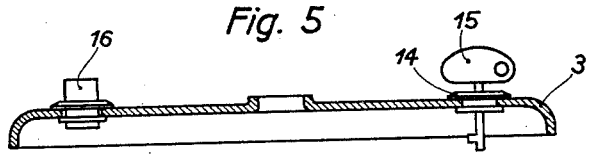
Figure 6:
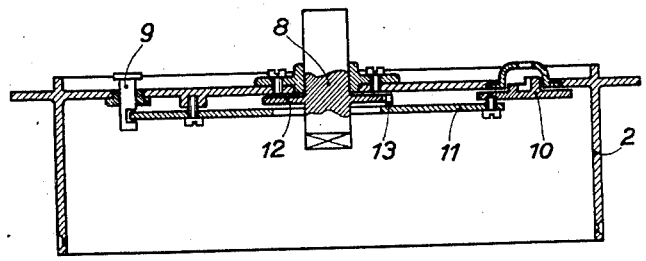
Figure 7:
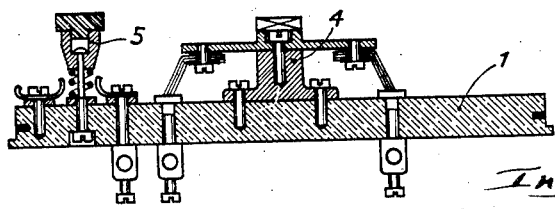

Our invention is illustrated diagrammatically and by way of example in the accompanying drawings in which Figure 1 is a section in the plane A—B of Fig. 2; Figure 2 a plan of the complete device; and Figure 3 a section in the plane C—D of Fig. 2; Figures 4, 5, 6 and 7 show the above-mentioned three superposed main-parts of the switch-box (Figs. 5, 6, 7) and a detail (Fig. 4).

The three main parts are formed by the base-plate 1 and its appertaining members, the casing 2 and its appertaining members, and the cover 3 and its appertaining members.

The members pertaining to the base-plate 1 are the electrically active members which consist of a change-over switch 4 for the illumination circuits, a push-button switch 5 for the starter-circuit, an incandescent lamp 6 for indicating purposes, such as indicating an open or closed position of the switch or an open or closed condition of a circuit, and of a safety-fuse 7 with its appertaining wire-clamps and the connecting wires.

The members pertaining to the casing 2 are a centrally disposed spindle 8 by which the change-over switch 4 of the base-plate is to be operated. The head or top of this switch and the lower end of the spindle 8 are so devised as to form a claw-coupling by which the spindle and the switch can be coupled with one another. 9 denotes a slide, which is actuated by the operation of the push-button 5. 10 denotes a lock by which a bolt 11 can be moved in such a manner that a cam 12 affixed to the spindle 8 can be locked by means of a pin 13 so that the cam cannot be turned. The free end of the bolt 11 can engage a notch provided in the slide 9 whereby this slide will be locked and cannot, therefore, be actuated. The frontal plate of the casing is provided with openings permitting inspection, and affording access to the safety cartridge and the indicator-lamp 6.

The members pertaining to the cover 3, through a central aperture of which the spindle 8 projects, are a bearing 14 for the key 15 of the lock 10, a press-button 16 for actuating the slide 9, and a window 17 through which the light produced by the lamp 6 can pass out. When the cover is in place on the casing it is secured in this position by putting the switch-grip 18 upon the projecting end of the spindle 8; the grip is secured in its position by a screw 19. A projection 20 provided at the hub of the grip serves as a hand and co-operates with marks 0 1 2 and so on, and indicates in this way the position of the grip and of the change-over switch 4.

From the preceding detailed description it will be seen that the electrically active members are assembled upon the base-plate 1 and can be examined and tested after they have been mounted thereupon. The members pertaining to the casing can also be examined and tested without interfering in the least with those of the base-plate or those of the cover. The cover and the members pertaining to it can be mounted together quite independently, save the grip 18 which is put upon and affixed to the spindle 8 after the cover has been put upon the casing. To disconnect the cover from the casing it is sufficient to unscrew the screw 19 whereafter it is possible to exchange the safety fuse and the indicating lamp without further disassembling the apparatus.

The above-described construction of the switch-box is such that it is rendered possible to manufacture switch-boxes of this kind in whole-sale production and at greatly reduced costs, because it is possible to have the three main parts (Figs. 5, 6, 7) manufactured, examined, and tested in three workshops, independently from one another, and they may be composed in a fourth, if desired. The finished switch-box is nearly perfectly smooth on its exterior faces and looks nicely whereby it differs advantageously from the switch-boxes now in use. With these latter the grips for the safety-fuse cartridge and the unscrewable window permitting the exchange of the indicating lamp are arranged in the cover of the box, whereas in our present improved construction the just-mentioned parts are arranged within the casing, below the cover, so that they are covered, but are at once accessible.

We wish it to be understood that the details of the apparatus may be varied without departing from the invention. The lock 8 may be coupled, for instance, by means of a disengaging coupling with a switch attached to the base-plate and serving for the ignition circuit or circuits, the illuminating circuit or circuits, and the starting circuit which are rendered dependent upon one another by the locking means provided for this purpose. Instead of the indicating lamp 6 another occular indicating device may be chosen. The chief point to be observed in any case is that the electrically active members and the mechanically active members are combined in sets or groups permitting assembling, mounting, examining and testing the appertaining parts of either group independently of the other one; this is true also of the indicating and operating members forming the third group or set, as described.

We claim:

1. An electric switch-box assembly comprising in combination a plurality of members, one of said members carrying a plurality of electrical circuit connecting devices, a second of said members carrying mechanical means for actuating and locking means for controlling the operation of said circuit connecting devices, and a third of said members being a closure member retained by said actuating means, said members being adapted and arranged to be readily assembled and disassembled.

2. An electric switch-box assembly for automobiles comprising in combination a plurality of members, one of said members carrying a plurality of electrical circuit connecting devices, a second of said members carrying mechanical means for actuating and locking means for controlling the operation of said circuit connecting devices, and a third of said members adapted to serve as a cover and carrying switch actuating means, the first two of said members being adapted and arranged to be operatively assembled independently of the third.

3. An electric switch-box assembly for mounting and housing a plurality of circuit connecting devices, an indicating lamp and safety fuses associated with an automobile electrical system, said assembly comprising in combination a plurality of members, one of said members carrying the plurality of circuit connecting devices, the indicating lamp, and safety fuses, a rotatable member carried by a second one of said members for actuating said electrical circuit connecting devices, locking means carried by said second member for locking said rotatable member, said second member being apertured to permit ready removal and replacement of said indicating lamp and said safety fuses, and a third of said members serving as a cover for the other members provided with a window permitting a view of said indicating lamp, and being apertured to permit passage of said rotatable member and to permit access to said locking means, all of said members being mutually adapted and arranged to be readily assembled and disassembled and being further characterized by the adaptability of each of said members to be separately, operatively assembled independently of each other.

4. A switch box for mounting and containing the control apparatus for the electrical system of an automobile, comprising a base member carrying a switch, indicating lamp and fuse associated with the automobile electrical system, said lamp and fuse being removably mounted on the said member, a second member arranged to be superposed upon the base member with apertures arranged to permit the removal and replacement of said lamp and fuse and carrying mechanical means for transmitting motion to the switch together with locking means for said transmitting means, said transmitting means being arranged to operatively engage with said switch during superposition of the second member upon the base member, hand actuating means for said transmitting means and locking means respectively, and a third member arranged to be superposed upon said second member and provided with openings through which hand actuated means extend into engagement with the said transmitting and locking means respectively.

5. An electrical switch box for automobiles, comprising a base member having a switch mounted thereon, an intermediate member arranged to be superposed upon the base member and carrying a complete mechanical motion transmission system for the switch arranged to operatively engage with the switch upon superposition of the intermediate member upon the base, locking means for the transmission system carried by the intermediate member, and a cover member arranged to be superposed upon the said intermediate member and provided with apertures through which outside mechanical connection is effected with said mechanical transmission system and said locking means.

In testimony whereof we have hereunto affixed our signatures.

HEINRICH CONZELMANN.
ROBERT MAIER.